No. 864,365. PATENTED AUG. 27, 1907.
H. B. E. FROST.
CENTRIFUGAL MACHINE.
APPLICATION FILED DEC. 12, 1906.

Witnesses
A. Knight
H. N. Simms

Inventor
Harald Broder Emil Frost
By Emil Bönnelycke
Atty.

UNITED STATES PATENT OFFICE.

HARALD BRODER EMIL FROST, OF COPENHAGEN, DENMARK.

CENTRIFUGAL MACHINE.

No. 864,365.  Specification of Letters Patent.  Patented Aug. 27, 1907.

Application filed December 12, 1906. Serial No. 347,570.

*To all whom it may concern:*

Be it known that I, HARALD BRODER EMIL FROST, correspondent, a subject of Denmark, residing at No. 3 Gernersgade, Copenhagen, in the Kingdom of Denmark, have invented new and useful Improvements in Centrifugal Machines for Separating Liquids, of which the following is a specification.

This invention relates to a form of outlet channel for those centrifugal separators in which a funnel extending through the neck of the centrifugal drum is placed above the conical or funnel shaped plates; between the outer side of this funnel and the wall of the drum or the wall of the drum cover the heavier liquid such as skim milk rises to the outlet openings, while the lighter liquid such as cream arrives at its outlet opening in the neck of the drum through the inner part of the funnel. In such centrifugal drums, it has already been proposed to let out the skim milk through broad horizontal slots in the neck of the drum, while the cream issues through an adjustable hollow screw, so that by adjusting the screw the relation between the outflow of both fluids can be regulated; it has been found however that the regulation is made more difficult when these broad slots are used, and by the present invention the outlet openings are formed in such a way, that this difficulty is removed. This can be done by lengthening the neck of the funnel which fits tightly in the neck of the drum so that it extends a short distance beyond the said neck while at the same time as outlet channels for the skim milk vertical channel shaped indentations are arranged in the part lying within the neck of the drum, so that the skim milk can pass over the latter by way of these channels. The relation between output of milk and cream is regulated by a screw in the cream outlet opening, this screw being provided with an outlet channel parallel to its axis but eccentric thereto, so that by turning the screw this channel is brought nearer to or farther from the axis of the drum and the outflow of cream thus regulated.

The invention is illustrated in the accompanying drawing in which

Figure 1:
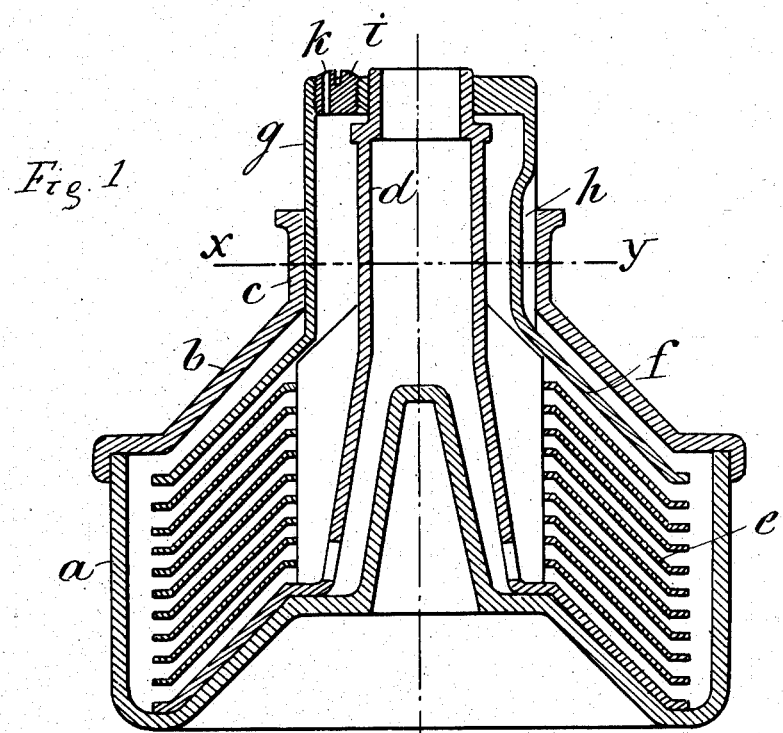
Figure 2:
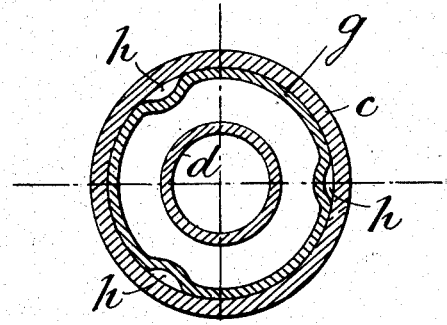

Figure 1 is a vertical section through the axis of the separator, and Fig. 2 is a horizontal section on the line X—Y in Fig. 1.

The centrifugal drum $a$ has a cover $b$ with neck $c$, a central pipe $d$ and conical plates $e$. Above the plates $e$ is a funnel $f$, the neck $g$ of which is led through the neck $c$ of the drum cover and fits tight therein. In the neck $g$ one or more (in the drawings 3) channel shaped indentations $h$ are made, through which the skim milk passes out over the neck of the drum cover. The neck of this funnel is closed at its upper end around the central pipe $d$, and has at the top an outlet for the cream closed by a screw $i$, the screw having a vertical eccentric outlet channel $k$, so that by turning the screw the outflow of cream can be regulated.

Having now particularly described and ascertained the nature of my said invention I declare, that what I claim is:

1. The combination with a centrifugal drum having a cover provided with a reduced neck, and a series of conical plates arranged in the drum, of a funnel arranged above the plates and having a projection fitting in said reduced neck; said projection having vertical channels formed in its outer wall and extending above and below the reduced neck of the cover.

2. In a centrifugal separator the combination with the drum having a cover provided with a reduced neck, and a series of conical plates arranged in the drum, of a funnel arranged above the plates and projecting through said neck and having vertical channels formed in the outer wall of its projecting part and extending above and below the reduced neck of the cover for the discharge of the skim milk, and a vertical screw arranged in the upper end of the funnel and provided with a vertical eccentric cream-outlet.

In testimony whereof I have signed my name to this specification in the presence of two subscribing witnesses.

HARALD BRODER EMIL FROST.

Witnesses:
 MARCUS MÖLLER,
 JÄRGEN GEORG MAARDE.